United States Patent
Loper et al.

(10) Patent No.: US 11,049,332 B2
(45) Date of Patent: Jun. 29, 2021

(54) FACIAL PERFORMANCE CAPTURE IN AN UNCONTROLLED ENVIRONMENT

(71) Applicant: LUCASFILM ENTERTAINMENT COMPANY LTD., San Francisco, CA (US)

(72) Inventors: Matthew Loper, San Francisco, CA (US); Stéphane Grabli, San Francisco, CA (US); Kiran Bhat, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

(21) Appl. No.: 16/808,110

(22) Filed: Mar. 3, 2020

(65) Prior Publication Data
US 2020/0286301 A1      Sep. 10, 2020

Related U.S. Application Data

(63) Continuation-in-part of application No. 16/681,300, filed on Nov. 12, 2019.
(Continued)

(51) Int. Cl.
*G06T 19/20* (2011.01)
*G06T 7/80* (2017.01)

(52) U.S. Cl.
CPC .............. *G06T 19/20* (2013.01); *G06T 7/80* (2017.01); *G06T 2200/08* (2013.01); *G06T 2207/30201* (2013.01); *G06T 2219/2021* (2013.01)

(58) Field of Classification Search
CPC .......... G06T 7/80; G06T 13/40; G06T 17/00; G06T 19/20; G06T 2200/08; G06T 2207/30201; G06T 2219/2021
(Continued)

(56) References Cited

U.S. PATENT DOCUMENTS

| 8,144,153 B1 | 3/2012 | Sullivan et al. |
| 8,207,971 B1 | 6/2012 | Koperwas et al. |

(Continued)

FOREIGN PATENT DOCUMENTS

WO     2018053703 A1     3/2018

OTHER PUBLICATIONS

Jiang, Luo, et al. "3d face reconstruction with geometry details from a single image." IEEE Transactions on Image Processing 27.10 (2018): 4756-4770 (Year: 2018).*
(Continued)

*Primary Examiner* — Sae Won Yoon
(74) *Attorney, Agent, or Firm* — Kilpatrick Townsend & Stockton LLP

(57) ABSTRACT

A method of transferring a facial expression from a subject to a computer generated character that includes: receiving a plate with an image of the subject's facial expression and an estimate of intrinsic parameters of a camera used to film the plate; generating a three-dimensional parameterized deformable model of the subject's face where different facial expressions of the subject can be obtained by varying values of the model parameters; solving for the facial expression in the plate by executing a deformation solver to solve for at least some parameters of the deformable model with a differentiable renderer and shape-from-shading techniques, using as inputs, the three-dimensional parameterized deformable model, estimated intrinsic camera parameters, estimated lighting conditions and albedo estimates over a series of iterations to infer geometry of the facial expression and generate an intermediate facial; generating, from the intermediate facial mesh, refined albedo estimates for the deformable model; and solving for the facial expression in the plate by executing the deformation solver using the intermediate facial mesh, the estimated intrinsic camera
(Continued)

parameters, the estimated lighting conditions and the refined albedo estimates as inputs over a series of iterations to infer geometry of the facial expression and generate a final facial mesh using the set of parameter values of the deformable model which result in a facial expression that more closely matches the expression of the subject in the plate than does the intermediate facial mesh.

20 Claims, 5 Drawing Sheets

Related U.S. Application Data

(60) Provisional application No. 62/815,000, filed on Mar. 7, 2019, provisional application No. 62/814,994, filed on Mar. 7, 2019.

(58) Field of Classification Search
USPC .......................................................... 345/423
See application file for complete search history.

(56) References Cited

U.S. PATENT DOCUMENTS

| | | | |
|---|---|---|---|
| 9,437,034 B1 | 9/2016 | Wei et al. | |
| 2002/0128060 A1* | 9/2002 | Belhumeur | G06T 17/10 463/25 |
| 2008/0170077 A1 | 7/2008 | Sullivan et al. | |
| 2010/0134487 A1 | 6/2010 | Lai et al. | |
| 2015/0215623 A1 | 7/2015 | Sanders et al. | |
| 2015/0332127 A1 | 11/2015 | Zheng et al. | |
| 2017/0185843 A1 | 6/2017 | Goto et al. | |
| 2017/0301125 A1 | 10/2017 | Bouaziz et al. | |
| 2018/0033189 A1 | 2/2018 | Ma et al. | |
| 2018/0046854 A1* | 2/2018 | Kittler | G06K 9/00248 |
| 2018/0068178 A1 | 3/2018 | Theobalt et al. | |
| 2019/0035149 A1 | 1/2019 | Chen et al. | |
| 2019/0043252 A1 | 2/2019 | Venshtain et al. | |
| 2019/0124244 A1 | 4/2019 | Knoll et al. | |
| 2020/0013212 A1* | 1/2020 | Wang | G06T 15/04 |
| 2021/0007806 A1 | 1/2021 | Karade et al. | |

OTHER PUBLICATIONS

Thies, Justus, et al. "Real-time expression transfer for facial reenactment." ACM Trans. Graph. 34.6 (2015): 183-1 (Year: 2015).*

GB2003167.0, "Search Report", dated Aug. 20, 2020, 4 pages.

Suwajanakorn, et al., "Total Moving Face Reconstruction", Presented at the European Conference on Computer Vision (ECCV), http://www.supasorn.com//eccv14_totalmoving.pdf, Sep. 4, 2014, 17 pages.

AU2020201618, "First Examination Report", dated Nov. 16, 2020, 8 pages.

Flueckiger, "Computer-Generated Characters in Avatar and Benjamin Button", Available Online at <https://www.zauberklang.ch/AvatarButtonFlueckiger.pdf>, 2011, pp. 1-28.

NZ762338, "First Examination Report", dated Dec. 8, 2020, 3 pages.

U.S. Appl. No. 16/681,300, "Notice of Allowance", dated Mar. 26, 2021, 23 pages.

* cited by examiner

FACIAL PERFORMANCE CAPTURE IN AN UNCONTROLLED ENVIRONMENT

CROSS-REFERENCES TO RELATED APPLICATIONS

This application is a continuation-in-part of U.S. patent application Ser. No. 16/681,300, filed Nov. 12, 2019 and entitled "On-Set Facial Performance Capture and Transfer to a Three-Dimensional Computer-Generated Model", which claims the benefit of U.S. patent application No. 62/814,994 filed on Mar. 7, 2019. This application also claims the benefit of U.S. Patent Application No. 62/815,000, filed Mar. 7, 2019. The disclosure of each of the Ser. Nos. 16/681,300; 62/814,994 and 62/815,000 applications is incorporated by reference herein in its entirety for all purposes.

FIELD

The present disclosure relates generally to performance capture, and more specifically to methods, techniques and systems for capturing facial expressions from a subject in previously filmed footage and transferring the captured expressions to a three-dimensional rendering of the subject.

BACKGROUND OF THE INVENTION

Facial expression transfer is the act of adapting the facial expressions of a subject, such as an actor, to a three-dimensional computer-generated (CG) model that can be used to create visual effects that can then be incorporated into animations, movies, video games and the like. Mastering facial expression transfer and other aspects of facial animation is a long-standing challenge in computer graphics. The face can describe the emotions of a character, convey their state of mind, and hint at their future actions. Audiences are particularly trained to look at faces and identify these subtle characteristics. Accurately capturing the shape and motion of real human faces in the expression transfer process can play an important role in transferring subtle facial expressions of the subject to a computer-generated character giving the computer-generated character natural, life-like expressions.

In order to transfer facial expressions from a subject to a computer-generated model, the subject's facial expressions first have to be captured, for example, on digital film or another appropriate medium. Some traditional techniques that are used to capture facial expressions of a subject (e.g., of an actor during a performance) rely on numerous markers positioned at strategic locations on an actor's face and a head-mounted, high-resolution camera that is directed towards the actor's face. The camera can then be used to film the actor's face during his or her performance. Software can track movement of the markers as the actor's face displays different expressions during the performance and translated the marker movement into a computer-generated model that mimics the actor's facial expressions.

While such techniques have been successfully used in a variety of different situations including in various well-known movies, it is not possible to use these techniques for facial performance capture from previously filmed footage of a past performance filmed in an uncontrolled environment which the actor(s) did not wear such head-mounted cameras and/or in which markers were not placed on the actor's face during the performance.

SUMMARY OF THE INVENTION

Embodiments of the invention pertain to methods and systems for facial performance capture from film or video footage previously taken in a fully uncontrolled environment in which actors or other subjects in the previously filmed footage were not wearing a head-mounted camera or strategically-positioned markers on their faces and in which the camera parameters and/or illumination conditions for the footage may not be known. The captured facial expressions can be transferred to a computer-generated model of the actor or subject and used to in the context of visual effects production. In some embodiments the method iteratively deforms a three-dimensional mesh with the goal to minimize the difference between a 3D render of that mesh and the plate (i.e. a frame from the previously filmed footage). A differentiable renderer can be used to generate the 3D face renders making it possible to leverage well-known derivative-based minimization techniques to meet the goal.

Some embodiments provide a method of transferring a facial expression from a subject to a computer generated character where the subject was filmed in an uncontrolled environment with low-frequency, static illumination. The method includes receiving a plate with an image of the subject's facial expression and an estimate of intrinsic parameters of a camera used to film the plate; generating a three-dimensional parameterized deformable model of the subject's face where different facial expressions of the subject can be obtained by varying values of the model parameters; and generating, from the plate, an estimate of lighting conditions that illuminate the subject in the plate and albedo estimates for the deformable model. The method can solve for the facial expression in the plate by executing a deformation solver to solve for at least some parameters of the deformable model with a differentiable renderer and shape-from-shading techniques, using as inputs, the three-dimensional parameterized deformable model, the estimated intrinsic camera parameters, the estimated lighting conditions and the albedo estimates over a series of iterations to infer geometry of the facial expression and generate an intermediate facial mesh using the set of parameter values of the deformable model which result in a facial expression that approximates the expression of the subject in the plate.

The method can further include generating, from the intermediate facial mesh, refined albedo estimates for the deformable model; and solving for the facial expression in the plate by executing the deformation solver using the intermediate facial mesh, the estimated intrinsic camera parameters, the estimated lighting conditions and the refined albedo estimates as inputs over a series of iterations to infer geometry of the facial expression and generate a final facial mesh using the set of parameter values of the deformable model which result in a facial expression that more closely matches the expression of the subject in the plate than does the intermediate facial mesh In some embodiments the three-dimensional parameterized deformable model can include a plurality of blendshapes that represent different facial expressions of the subject and include a set of blendshape weight values, one per blendshape. The final facial mesh is obtained by choosing a set of weighted blendshapes that best mimic the facial expression in the plate. In various embodiments the deformable model can also include rotation and translation values that represent a rigid adjustment of the subject's head as well as a delta vector that represents a per vertex displacement used in transferring the facial expression of the subject to the computer-generated character, which can be particularly useful where the computer-generated character has a head sized or shaped differently than the head of the subject.

In some embodiments the plate can be an image made up of thousands or even more than a million pixels. Each pixel can have a particular RGB value. During each iteration of the series of iterations the differentiable renderer can generate a rendering of the deformable model and a solver can then try to minimize differences between the RGB values of the plate and the RGB values of corresponding pixels in the rendered version of the deformable model. An initial iteration of the solving can include: rendering an initial facial mesh generated from the three-dimensional deformable model representing a neutral expression of the subject; trying to minimize differences between RGB values of the plate and RGB values of the rendered initial facial mesh representing the neutral expression; and generating an updated facial mesh including a set of weighted blendshapes that represents a facial expression of the subject that is more similar to the facial expression of the subject in the plate than is the initial facial mesh. In each additional iteration of the solving step, an output of that iteration can be generated that is closer to the actual representation of the subject in the plate than an output of the previous iteration.

In additional embodiments, a method of transferring a facial expression from a subject to a computer generated character where the subject was filmed in an uncontrolled environment with low-frequency, static illumination can include: receiving digital footage of the performance including a plurality of sequentially ordered plates each of which includes an image of the subject's facial expression and receiving an estimate of intrinsic parameters of a camera used to film the plurality of plates; generating a three-dimensional parameterized deformable model of the subject's face where different facial expressions of the subject can be obtained by varying values of the model parameters; and generating, from one or more plates in the plurality of plates, an estimate of lighting conditions that illuminate the subject in each plate and albedo estimates at different vertices of the deformable model.

The method can further include generating a computer model of the performance by, for each individual plate in the plurality of sequentially ordered plates, processing the individual plate independently of other plates in the plurality of plates to solve for the facial expression in the plate being processed by: executing a deformation solver to solve for at least some parameters of the deformable model with a differentiable renderer and shape-from-shading techniques, using as inputs, the three-dimensional parameterized deformable model, the estimated intrinsic camera parameters, the estimated lighting conditions and the albedo estimates over a series of iterations to infer geometry of the facial expression and generate an intermediate facial mesh using the set of parameter values of the deformable model which result in a facial expression that approximates the expression of the subject in the plate; generating, from the intermediate facial mesh, refined albedo estimates at the different positions of the deformable model; and solving for the facial expression in the plate by executing the deformation solver using the intermediate facial mesh, the estimated intrinsic camera parameters, the estimated lighting conditions and the refined albedo estimates as inputs over a series of iterations to infer geometry of the facial expression and generate a final facial mesh using the set of parameter values of the deformable model which result in a facial expression that more closely matches the expression of the subject in the plate than does the intermediate facial mesh.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION OF SPECIFIC EMBODIMENTS

Embodiments of the invention pertain to methods and systems for facial performance capture from previously filmed film or video footage taken in a fully uncontrolled environment in which actors or other subjects in the previously filmed footage (sometimes referred to herein as "archival footage") were not wearing a head-mounted camera, did not have strategically-positioned markers on their faces and parameters (e.g., lighting conditions and camera intrinsics) for the conditions in which the film or video footage was filmed may not have been recorded or otherwise available. In this manner, embodiments of the invention enable film-production quality facial performance capture from archival footage where the director or other personnel involved with filming the initial footage may have not intended or even thought about the footage to be used for subsequent facial expression transfer.

While embodiments of the invention can be used with archival footage filmed under a variety of circumstances, some embodiments are particularly useful where the subject was filmed in an uncontrolled environment having low-frequency, static illumination. As used herein, low-frequency, static illumination is when the illumination in the archival footage is fixed over time and does not result in harsh shadows or strong shading contrast on the subject such that it can be well represented by the nine spherical harmonic components as described herein.

In some embodiments, a three-dimensional mesh is iteratively deformed with the goal to minimize the difference between a 3D render of that mesh and the plate (i.e., a frame from the previously filmed video footage). A differentiable renderer can be used by itself or in conjunction with other elements to generate the 3D face renders making it possible to leverage well-known derivative-based minimization techniques to meet the goal. Once the subject's facial expressions are captured in this manner and transferred to a three-dimensional parameterized deformable model of the actor, the model can be used in the context of visual effects production.

Figure 1:
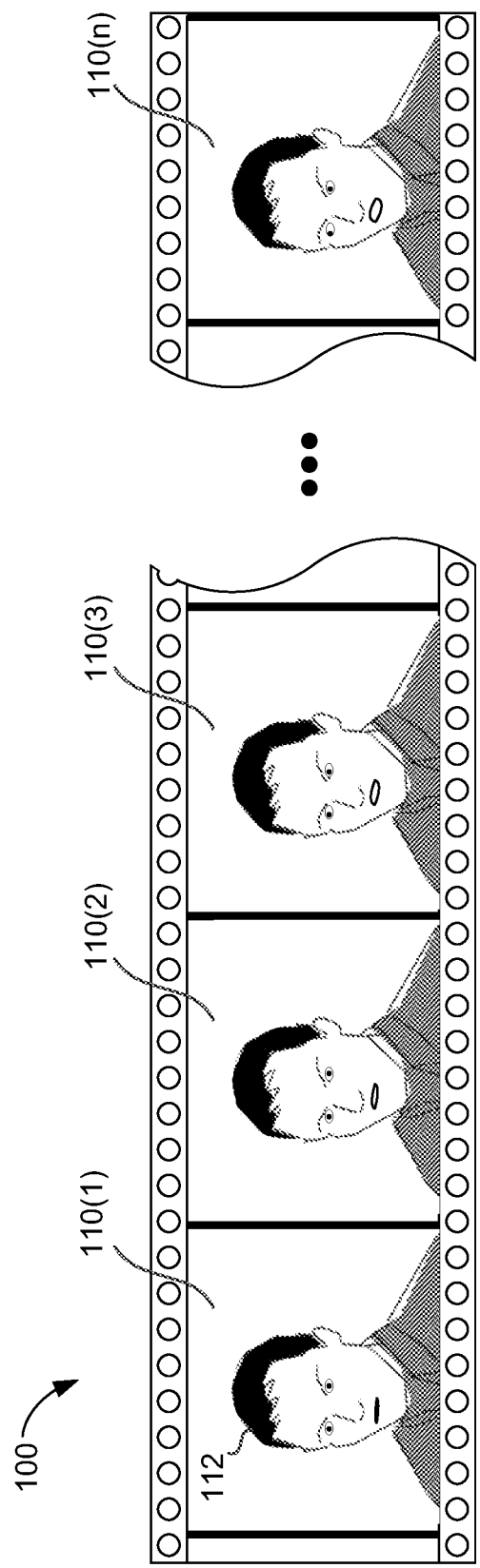
FIG. 1 is a simplified diagram of an exemplary film strip that can be processed for facial performance capture according to embodiments of the invention.

Example Video Footage:

In order to better understand and appreciate embodiments of the invention, reference is made below to FIG. 1, which is a simplified illustration of an exemplary sequence of film 100 in which individual frames (plates) of the film sequence depict a subject for which embodiments of the present invention can be employed to capture the facial expression of the subject. Film sequence 100 can be a film strip as shown in FIG. 1 filmed on a traditional camera and digitized or can be a digital sequence of frames filmed from a digital camera. Film sequence 100 can any number of individual frames 110 and will typically include hundreds, thousands or even more frames shown in FIG. 1 as frames 110(1), 110(2), 110(3) ... 110(n). Each frame 110 can include an image of a subject 112 for which embodiments of the invention can be used to capture the facial expression of the subject and transfer the captured facial expression to a computer-generated model of the subject. Thus, for example, as shown in frames 110(1) ... 110(n), as a facial expression of subject 112 changes from a relatively neutral expression in frame 110(1) to one of surprise in frame 110(n), embodiments of the invention can capture the changing expression and transfer the changing expression of surprise to a computer-generated character.

Figure 2:
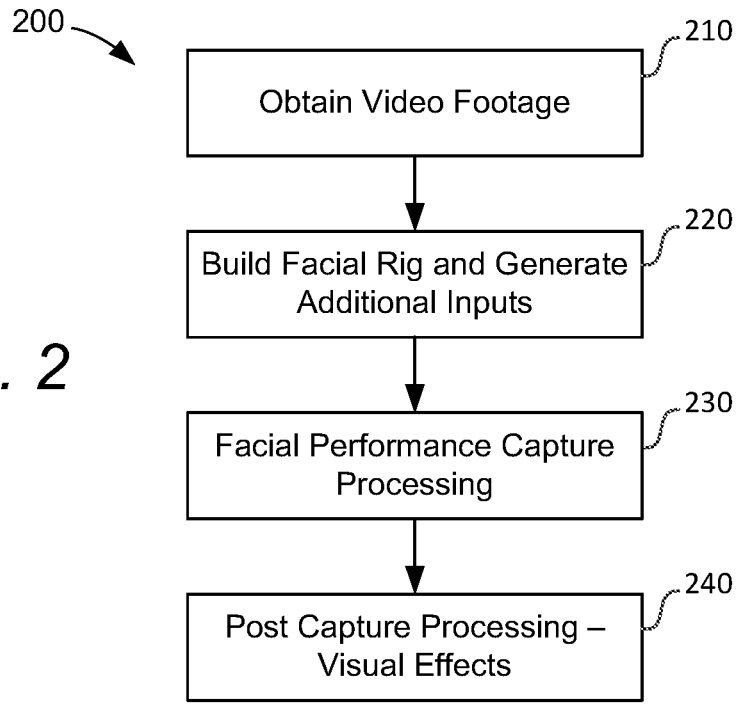
FIG. 2 is a simplified flowchart depicting a facial performance capture and expression transfer method according to some embodiments of the invention.

Facial Performance Capture:

Embodiments of the invention can be better understood from an exemplary use case scenario described with respect to FIG. 2, which is a simplified flowchart depicting a facial performance capture method 200 according to some embodiments of the invention. In contrast to a situation where facial performance capture is performed in a controlled environment where a director and technicians have access to the actors, the cameras and the performance area prior to filming, method 200 typically does not include any set-up or initiation tasks associated with filming film sequence 100 prior to the performance. Instead, method 200 can use film or video taken from a previous performance, such as film sequence 100, (block 210) and use one or several frames from that film sequence to perform various pre-capture steps (block 220) that embodiments of the invention can use to capture the facial expression of the subject and transfer the captured facial expression to a three-dimensional, computer-generated model of the subject (block 230). The three-dimensional model can, in turn, be used to create visual effects that can be incorporated into animations, movies, video games and the like (block 240).

Deformation Model

The pre-capture steps performed in block 220 can include, among others, building a facial rig for each actor for which the facial capture process is to be performed using a variety of different known techniques. The facial rig can be a three-dimensional parameterized deformable model of the actor's face. Parameters of the deformable model can be varied to generate different facial expressions of the actor allowing the deformable model to be manipulated to mimic the actor's facial expressions. In some embodiments the facial rig can be handcrafted by an artist from previously taken video footage, captured via an image-based scanning system or built from a mixture of both. For example, in some embodiments the facial rig can be generated by an artist who modifies a neutral expression of a generic human facial rig to better match the subject's face.

In some embodiments, the facial rig can be made of a simple set of linear blendshapes as described generally in U.S. Pat. No. 8,207,971, entitled "Controlling Animated Character Expressions", which is incorporated by reference herein in its entirety. Other embodiments of the invention also support solving for a more complex rig with rotational-translational joints and skinning as well as arbitrary functional mapping between rig controls and final blend shape weights.

Embodiments of the invention are not limited to deformable models based on blendshapes. For example, in other embodiments the three-dimensional parameterized deformable model can be made purely of per-vertex displacements. In still other embodiments, more sophisticated models that rely on per-patch deformation and don't use blendshapes in the traditional sense of the term can be used. In various embodiments, different facial expressions can be attained by setting different parameter values for the deformable model. For example, for a three-dimensional parameterized deformable model based on blendshapes, different facial expressions can be attained from a linear combination of a selected set of facial expressions (i.e., blendshapes) from the facial rig. By adjusting one or more parameters associated with the linear combination, a range of facial expressions can be created while utilizing relatively small amounts of computational resources.

As an example, some embodiments of the invention use a deformation function that produces a facial expression mesh M by combining linearly a set of m three-dimensional blendshapes $B_0, B1, B2, \ldots B_m$, where each $B_j$ is made of n vertices and represents a predefined canonical expression (e.g., inspired from Facial Action Coding System (FACS) shapes), where $B_0$ is the neutral expression, and where per-vertex displacements $\delta$ are added. A rotation R and translation t can also be applied to the resulting geometry. Thus, the deformation for a vertex of index i can be as follows:

$$M(i)^T = \left[ B_o(i) + \sum_{j=1}^{m} w_j(B_j(i) - B_o(i)) + \delta(i) \right]^T \cdot R + t \quad (1)$$

where the $w_j$ are the blend shape weights, i.e. the weights used to combine the blend shapes linearly. The rotation R, the translation t, the blendshape weights wj and the per-vertex displacements $\delta(i)$ are the parameters of the deformable model.

This deformation is versatile in the sense that it incorporates both a strong prior in the form of blend shapes and a less constrained deformation component through the deltas (per-vertex 3D displacements), which enables expressions to be matched which, expectedly, go beyond the abilities of the shapes alone. Some embodiments also support more complex facial rigs and deformation functions which include rotational and/or translational joints and skinning (e.g., for the jaw) in addition to blendshapes and deltas. Some embodiments also support arbitrary functional mapping between a set of user-facing controls and final shape (or joint) weights.

Additional Inputs

In addition to the facial rig, embodiments of the invention can generate and use some or all of the following inputs to capture the facial performance of an actor in a strip of film, such as film strip 100:

1) An estimate of the camera intrinsic parameters (e.g. focal length) and, if the camera was moved when filming the film strip, an estimate of the camera extrinsic (camera rotation and translation for each frame). If the camera is fixed during the filming, then only its intrinsics are required.
2) A set of 2D virtual facial landmarks at predetermined locations as determined by using known machine-learning-based techniques. The set of 2D landmarks is similar to markers that might otherwise have been placed on the subject's face but each is estimated from scratch at each frame and thus is potentially less accurate than if actual markers were available. As far as embodiments of the invention are concerned, however, the 2D virtual landmarks behave very similarly to markers as each are 2D points that can be "anchored" on the mesh on the reference frame.
3) The rigid motion of the 3D facial mesh throughout the footage, i.e. an estimate of the rotational and translational components of the head for each frame. This is usually achieved through layout techniques standard in VFX (tracking of a very sparse set of manually-picked rigid features on the head). In the absence of this data, embodiments can leverage the machine-based virtual 2D landmarks to solve for a first estimate of the rigid motion. This estimate can be later refined in the context of the facial expression solve.
4) A hand-matched pose for a reference frame—i.e., for one of the frames of the footage an artist manually dials in facial rig controls to best match the expression from the plate. In the case of strong head rotation, it can be useful to produce two or three reference frames rather than one to improve the albedo and lighting estimate (described below). This pose matching can also be done automatically (albeit more approximately) leveraging machine-learning-based virtual facial landmarks.
5) Rotoscoped splines for the eye lids and lips. Embodiments support two types of splines: view-independent and view-dependent. View-independent splines delimit easily recognizable feature lines of the face (specifically the eyelash line, and the upper and lower lip vermillion borders). View-independent splines are used to draw the inner mouth occluding contour.

Shading Model

A simplified shading model can accommodate the differentiability constraints imposed by an optimization framework while maintaining acceptable performances. In some embodiments the surface reflectance model can be a simple diffuse Lambertian model that supports environmental illumination. Embodiments can represent the environmental illumination using a second order Spherical Harmonics basis representation (i.e. nine components) or a higher order basis representation.

Because of the low-frequency nature of the illumination in the film strip, it is generally reasonable to ignore shadowing. However, when needed, embodiments can compute an approximate shadowing term through stochastic Monte-Carlo integration which is multiplied by the unshadowed scattered radiance. For example, in some embodiments a visibility term, V, can be computed as the proportion of samples for which the environment is unoccluded and the light samples can be importance-sampled according to the energy defined by the Spherical Harmonics components. Note that the visibility term is not easily differentiable and is considered a constant term in the optimization. Embodiments can update its value at every step of the iterative solve.

The model can also include an albedo term a represented as an RGB color for each vertex of the mesh. The albedo value at an arbitrary point on the surface of the mesh is obtained through barycentric interpolation of the albedo at the triangle vertices where the point lies.

With this model, the radiance $L_o$ scattering off a 3D point p of normal n on the mesh under an illumination defined by the Spherical Harmonics components $\{L_{lm}\} l \in \{0, 1, 2\}$, $m \in \{-l, -l+1, \ldots, l-1, l\}$ and with visibility V is $$L_o(p) = \alpha(p)V(p)\sum_{l=0}^{2}\sum_{m=-l}^{l}\sqrt{\frac{4\pi}{2l+1}}k_{lm}L_{lm}y_{lm}(n) \quad (2)$$

Where $\{k_{lm}\}$ is the set of nine Spherical Harmonics components for the clamped cosine and $\{Y_{lm}(n)\}$ is the set made of the first nine Spherical Harmonics basis functions evaluated in the direction defined by the surface normal n at the shading point. While some real-world objects would not be well approximated by this simplified shading model, it works well enough for faces thanks to the mostly diffuse nature of human skin when illuminated under low-frequency lighting.

In some embodiments, a version of the shading model can also include a specular term, modeled as Phong lobe.

Solving for the Performance

Figure 3:
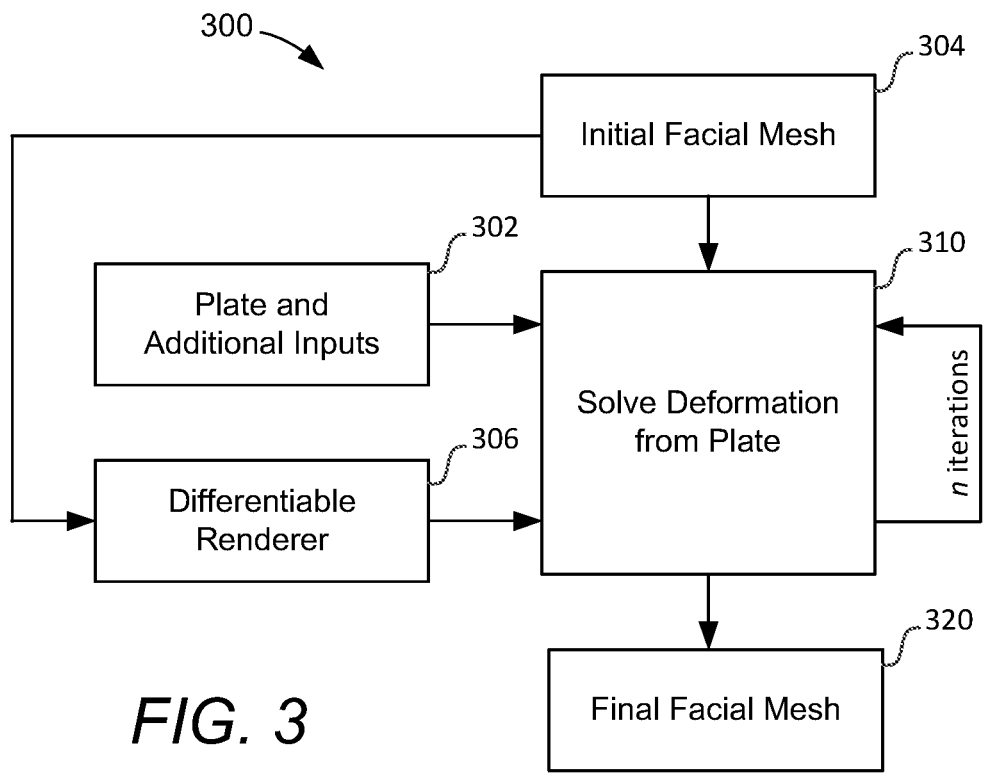
FIG. 3 is a simplified flowchart of steps associated with matching facial expressions of an actor captured during a performance to facial expressions of a computer-generated model of the actor according to some embodiments of the invention.

After the facial rig is built and other inputs generated (FIG. 2, block 220), embodiments of the invention can solve for the performance in the film strip (block 230). FIG. 3 is a simplified flowchart of a method 300 of post-capture processing that can be performed as part of block 230 according to some embodiments of the invention. Method 300 can match facial expressions of an actor from a previously filmed performance (e.g., film strip 100 obtained in block 210) to facial expressions of a computer-generated model of the actor. Method 300 can be performed on each and every plate in a sequence of video so that the facial expressions of a computer-generated model of the actor matches the facial expressions of the actor throughout the entire video sequence. In some embodiments method 300 can be performed such that each plate in the sequence of video frames can be processed independently without depending on the processing or solving of one or more previous plates. Thus, some embodiments of the method 300 allow each plate of a filmed video sequence to be processed in parallel taking advantage of the parallelization offered by computer clusters.

For each plate processed on a plate-by-plate basis, method 300 can start with various inputs including a plate from the performance capture session (block 302) and an initial facial mesh (block 304) representing a neutral geometry of a deformable model generated, for example, as described above with respect to FIG. 2, block 220. The initial facial mesh (i.e., initial deformable model) can include the rigid adjustment (rotation and translation), the blend shape weights and the per-vertex deltas for the deformable model that define the neutral geometry. A differentiable renderer (block 306) can render the initial facial mesh and then method 300 can solve the deformation from the plate (block 310) by trying to minimize the differences between the initial deformable model (i.e., neutral expression) and the actor's actual facial expression in the plate using a sequence of deformation solvers as discussed below based on various inputs as described below over a series of n iterations. Thus, the solver in block 310 calculates an expression of the deformable model that is closest to the expression of the actor in the plate.

Each of the n iterations involved with solving the deformation in block 310 generates a revised version of the deformable model (i.e., updated values for the parameters of the deformable model) that changes in each iteration from the initial neutral expression of block 304 to an expression that comes closer and closer to resembling the actor's actual facial expression in the plate. The plate can be an image made up of millions of pixels where each pixel has a particular RGB value. In each iteration, block 310 uses the differential renderer (block 306) to generate a rendering of the deformable model for the particular iteration along with derivatives. The differentiable render is an image made up of pixels and, having access to derivatives of pixel color values with respect to parameters of the model generated by the differentiable renderer, the solver tries to minimize the differences between the RGB values of the plate and the RGB values of corresponding pixels in the rendered version of the deformable model. In each iteration the output of the solver (block 310) will get closer and closer to the actual expression of the actor in the plate until the final iteration produces a final facial mesh (block 320) in which the parameters of the deformable model (e.g., the various weights of the blendshapes and the values of the rigid rotation, translation and the per-vertex displacements) result in a facial expression that very closely matches the expression of the actor in the plate. Since embodiments of the invention provide the solver with a very dense set of pixels in each iteration, the solver can produce a more detailed solution for the performance compared to solutions calculated by traditional marker-based systems that are limited in the detail they capture by the number of markers being tracked.

Inputs for the Transferring Process

When solving the deformation in block 310, embodiments of the invention can use some or all of inputs generated in block 220 of FIG. 2 and described above along with the footage (i.e., the plate) of the performer whose facial expressions are being captured (block 302).

Embodiments of the invention can solve for the performance in block 310 with a differentiable renderer based on some or all of the above inputs using appearance and/or shading to infer geometry as opposed to using a standard VFX rendering system. For example, some embodiments can employ shape-from-shading techniques that can leverage gradient patterns on the image to provide clues as to what the actor's face is doing at the time the image was taken and use the gradient patterns to estimate what deformation the actor's face is doing based on the image.

As stated above, block 310 can try to minimize the differences between the deformable model and the actor's facial expression in the plate using multiple approaches or "solvers" based on the inputs from block 302. Each solver can execute one or more iterations (e.g., n iterations). The types of solvers used in block 310 and the number of iterations that each solver is executed can be chosen prior to implementing method 300. For example, in some embodiments, particular solvers can include between 10-15 iterations but embodiments of the invention are not limited to any particular number of iterations, however, and a user can choose more or fewer iterations as is deemed appropriate for each solver to reach an acceptable level of matching between the deformable model generated as the final facial mesh (block 320) and the original plate.

The goal of each solver is to find optimal values for its parameters (optimal being a function of what objectives are being solved). Each solvable parameter can be locked or have its value bounded. It can be, for instance, useful to only use a subset of shapes when trying to get a first blocking of the deformation. Similarly, shapes can be sculpted for values in [0, 1] and it is therefore desirable to limit their value to be within these bounds. Additionally, while solvers often solve for parameters of a model for a single plate, some solvers can use images from multiple plates to arrive at a more accurate solution.

Figure 4:
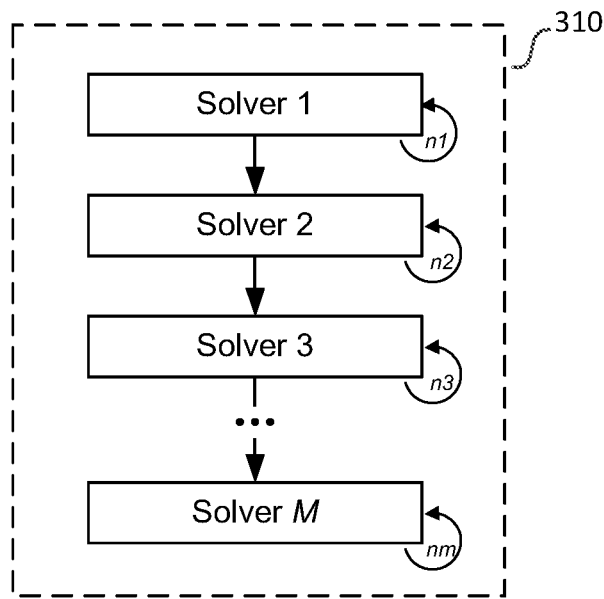
FIG. 4 is a simplified block diagram of an exemplary sequence of solvers that can be executed in block 310 of the method shown in FIG. 3 according to some embodiments of the invention.

In some embodiments block 310 can execute a sequence of solvers in a specific order. By running these solvers one after the other (each run over a series of iterations), embodiments can go from a neutral expression to the target expression on the plate. For example, FIG. 4 is a simplified block diagram of an embodiment where block 310 executes m "Solvers" (Solver 1, Solver 2, . . . Solver M) where each "Solver" can be executed a predetermined number of iterations before the next solver is executed. For the example shown in FIG. 4, Solver 1 will execute n1 iterations, then Solver 2 will execute n2 iterations, Solver 3 will execute n3 iterations and so on until Solver M executes its nm iterations.

Outputs

The final result of the solve in block 310 can be a final facial mesh (block 320) obtained from a deformable model that includes:

1) A rotation and translation value per frame (i.e., a rigid adjustment of the head);
2) A value for the weight vector $[w_0, w_1, \ldots, w_m]^T$ per frame (i.e., the weights of the various blendshapes that are used to calculate the expression); and
3) A value for the delta vector $[\delta(0), \delta(1), \ldots \delta(n)]^T$ per frame (i.e., a per vertex displacement used in transferring the facial expression of the actor to an animated character whose head can be larger or smaller and differently shaped than that of the actor).

Solving a large portion of the expression through shape weights is convenient for editing and retargeting (the transfer of the expression from the actor's model to a secondary model, like that of a creature for instance).

Solving for the Performance by Estimating and then Refining

Figure 5:
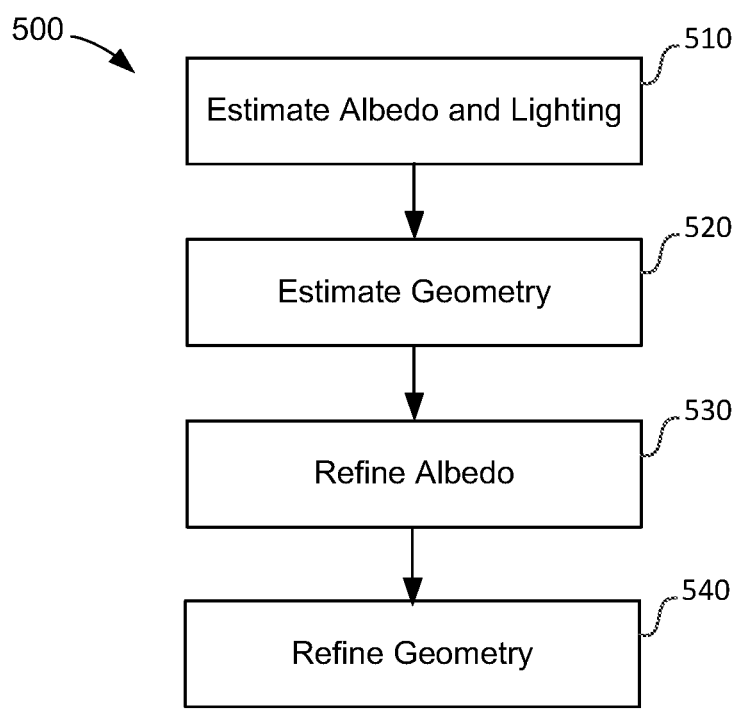
FIG. 5 is a simplified block diagram of a specific example of an approach to solve for a performance according to some embodiments of the invention.

Reference is now made to FIG. 5, which is a flowchart depicting steps associated with a method 500 of solving for the facial expressions of a subject from archival footage, such as film sequence 100, according to some embodiments. As shown in FIG. 5, method 500 can begin by first estimating the albedo and lighting for the film strip (block 510). This estimate need only be done once per take (i.e., it is run a single time using a single frame or a few frames together for a performance in a given sequence of film) and can be done as described in detail herein.

After estimating the albedo and lighting, the geometry for the facial performance can be estimated in first pass on a per frame basis (block 520). In practice, each frame can be processed individually, independently of other frames, which as mentioned above, allows embodiments of the invention to take advantage of the parallelization offered by computer clusters.

Once a first estimation of the geometry at multiple frames is calculated, the multiple frames can be used to do a better estimation of the lighting and material. Thus, some embodiments of the invention use the estimated geometry from block 520 to refine the lighting and material initially estimated in block 510 and calculate a more accurate albedo (block 530). The more accurate albedo can then be used with the initial geometry solve to obtain a more refined and accurate geometry (block 540). Each of the geometry estimation blocks 520, 540 can estimate geometry as described above with respect to FIG. 3. This approach of providing initial estimates for the albedo and lighting and then for the geometry and then refining those results as described are particularly beneficial for solving for facial expressions in film sequences taken in an uncontrolled environment where precise lighting conditions and camera parameters are not known and where the actors did not wear strategically-placed markers on their face to facilitate facial expression capture.

Example Approach

Details for a specific approach for the method discussed with respect to FIG. 5 above, follow. It is to be understood that the formulas, parameters and sequence of steps discussed below are just one example of method 500. Formulas and parameters different than those listed below can be used in various embodiments and steps other than the specific example steps provided below can be used to estimate the geometry.

Albedo and Lighting Estimation

In some embodiments the albedo and lighting estimation (block 510) includes estimating the nine Spherical Harmonics components for the illumination on the reference frame using an initial 50% gray albedo. The energy term minimized for this is as follows:

$$[L_{lm}]_{l,m} = \underset{L_{lm}}{\operatorname{argmin}} \sum_{q \in I} \|L_o(\Pi^{-1}(q)) - I(q)\|^2 \quad (3)$$

Where $L_o$ is the radiance at a mesh point as defined in the previous section, I is the reference frame image, q is a 2D point in image space and $\Pi^{-1}$ is an inverse projection function which associates an image-space point to a point on the facial mesh. In practice, this inverse projection can be implemented using raytracing.

This is a non-linear least square problem that can be solved with an iterative solver (Levenberg-Marquardt or Dogleg in different implementations). Some embodiments then freeze the lighting estimated above and use a similar minimization to estimate the per-vertex albedo:

$$[\alpha(v_i)]_i = \underset{\alpha}{\operatorname{argmin}} \left( \sum_{q \in I} \|L_o(\pi^{-1}(q)) - I(q)\|^2 + \beta \sum_{v_i, v_j} \|\alpha(v_i) - \alpha(v_j)\|^2 \right) \quad (4)$$

Where the $v_i$ are vertices of the mesh. Outside of the parameter being optimized, the main difference with equation 3 is the presence of a regularizer (second term) which incentivizes the solver to estimate a smooth albedo. The stronger β, the smoother the albedo. For this phase, embodiments can pick a fairly high β to avoid capturing too much shading effects which are not strictly part of the albedo.

Using this newly estimated albedo, some embodiments of the invention can re-estimate the lighting as described first, and then the albedo again, and so one or more times.

In embodiments where the head rotation is important, two or more reference frames can be used in the above approach instead of just one. The solving operations are similar to the description above except that the solve is performed on the two or more reference frames jointly.

Geometry Estimation

Figure 6:
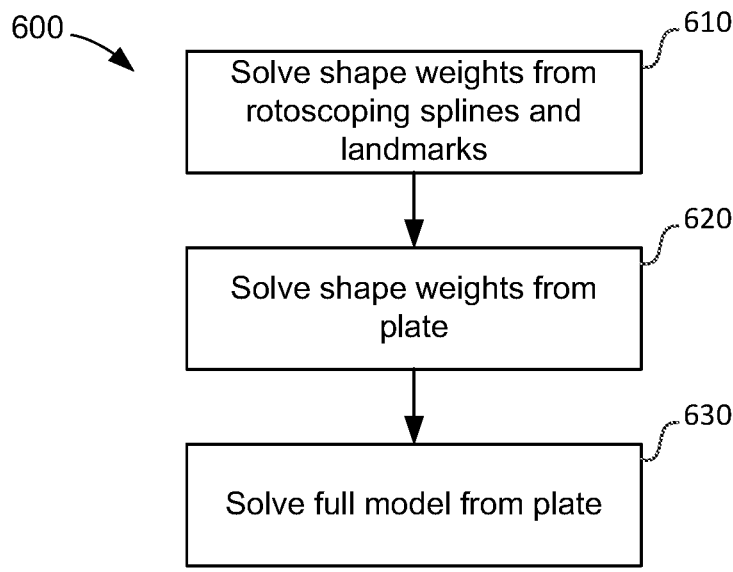
FIG. 6 is a simplified block diagram of a specific sequence of solvers that can be executed in block 520 of the method shown in FIG. 5 according to some embodiments of the invention.

While the albedo and lighting estimation described above need only happen once per take (i.e. it is run a single time using a single frame or a few frames together), the geometry solve in block 520 is run on a per-frame basis and, in this particular example, the geometry solve is divided into three stages (i.e., includes three solvers in accordance with block 310 in FIG. 4) as shown by method 600 in FIG. 6.

Solve Shape Weights from Rotoscoping Splines and Markers

In the first stage (block 610), the rotoscoping splines and, if they are available, the 2D markers are used to "block" the deformation. Regardless of the types of splines (view-dependent or view-independent), a set of candidate sample points on the mesh can first be identified which are matched to the set of 2D sample points on the spline (some embodiments build both sets such that they have similar 2D uniform sampling). Similarly, each 2D marker is associated with a point on the mesh, typically using the reference frame, unless the marker positions are known in advance.

Block 610 then solves for blend shape weights value by minimizing the following energy:

$$[w_0, w_1, \cdots, w_m] = \operatorname{argmin} \left( \sum_k \|\pi(M_k) - q_k\|^2 + \beta \sum_j \|w_j\|^2 \right) \quad (5)$$

where each $M_k$ is the evaluated deformable model (following the deformation model defined in equation 1) at the mesh sample points, where the $q_k$ are the 2D sample points on the spline and the 2D marker positions and where Π is the camera projection function.

Solve Shape Weights from Plate

Next, the shape weights are refined (block 620 by minimizing the following energy:

$$[w_0, w_1, \cdots, w_m] = \operatorname{argmin} \left( \sum_{q \in I} \|L_o(\pi(M_q)) - I(q)\|^2 + \beta \sum_j \|w_j - \overline{w_j}\|^2 \right) \quad (6)$$

where $M_q = (1-u-v)M_0 + uM_1 + vM_2$ is the deformable model evaluated (as specified by equation 1) as a barycentric interpolation of the vertices of the triangle intersected by raytracing a camera ray through pixel q. $\overline{w_j}$ is the initial value of weight $w_j$, as obtained after the previous phase.

This energy is typically combined with the previous energy defined for rotoscoping splines and 2D markers to maintain the positive influence of those sparser terms.

Solve Full Model from Plate

Finally, block 630 solves for all the parameters of the deformable model, i.e. the shape weights $[w_j]_j$, the deltas δ and the rigid transform (R, T), using shape-from-shading:

$$\{[w_0, \cdots, w_m], [\delta(0), \cdots, \delta(n)], R, t\} = \quad (7)$$
$$\operatorname{argmin} \left( \sum_{q \in I} \|L_o(\pi(M_q)) - I(q)\|^2 + \right.$$

$$\beta_0 \sum_j \|w_j - \overline{w_j}\|^2 + \quad (8)$$

$$\beta_1 \sum_i \|\delta(i)\|^2 + \quad (9)$$

$$\beta_2 \sum_i \left\|\nabla^2(i) - \overline{\nabla^2(i)}\right\|^2 + \quad (10)$$

$$\beta_3 \|t - \overline{t}\|^2 + \quad (11)$$

$$\beta_4 \|R - \overline{R}\|^2) \quad (12)$$

As described above, the rotoscoping spline and 2D marker residuals are typically included in this energy. At the end of this phase, a reasonably good approximation of the geometry is generated for every frame in the film sequence.

Albedo Refinement

Given the output of the previous phase, a few frames can be selected, ideally as distinct from one another as possible in terms of head pose, and minimize an energy similar to that of equation 4 except considering all selected frames at once to solve for the albedo. A smaller value for β can also be used at this point.

Geometry Refinement

After obtaining a more accurate albedo, a second (and last in this example) geometry refinement can be performed to update the initial geometry solve that approximates the facial expression in each plate to a final geometry solve that more closely match the expression of the subject in the plate than the initial solve. This geometry refinement step runs per-frame and can be implemented on each frame in parallel.

For each frame, the refinement step first re-estimates the lighting using equation 3. Next, it solves for the deltas using a simplified version of equation 7:

$$[\delta(0), \ldots, \delta(n)] = \underset{\ldots}{\mathrm{argmin}} \left( \sum_{q \in I} \|L_o(\pi(M_q)) - I(q)\|^2 + \quad (13) \right.$$

$$\beta_1 \sum_i \|\delta(i)\|^2 + \quad (14)$$

$$\left. \beta_2 \sum_i \left\|\nabla^2(i) - \overline{\nabla^2(i)}\right\|^2 \right) \quad (15)$$

As discussed above, the final result of the solve is a final facial mesh obtained from a deformable model that includes: a rotation and translation value per frame (i.e., a rigid adjustment of the head); a value for the weight vector $[w_0, w_1, \ldots, w_m]^T$ per frame (i.e., the weights of the various blendshapes that are used to calculate the expression); and a value for the delta vector $[\delta(0), \delta(1), \ldots \delta(n)]^T$ per frame (i.e., a per vertex displacement used in transferring the facial expression of the actor to an animated character whose head can be larger or smaller and differently shaped than that of the actor).

Example Computer Generated Imagery System:

FIG. 6 is a simplified block diagram of system 600 for creating computer generated imagery (CGI) and computer-aided animation that can implement or incorporate various embodiments in accordance with the disclosure. In this example, system 600 can include one or more design computers 610, object library 620, one or more object modeler systems 630, one or more object articulation systems 640, one or more object visual effects systems 650, one or more object simulation systems 660, and one or more object rendering systems 670. Any of the systems 630-670 may be invoked by or used directly by a user of the one or more design computers 610 and/or automatically invoked by or used by one or more processes associated with the one or more design computers 610. Any of the elements of system 600 can include hardware and/or software elements configured for specific functions.

The one or more design computers 610 can include hardware and software elements configured for designing CGI and assisting with computer-aided animation. Each of the one or more design computers 610 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 610 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 610 acting as a modeler may employ one or more systems or tools to design, create, or modify objects within a computer-generated scene. The modeler may use modeling software to sculpt and refine a 3D model to fit predefined aesthetic needs of one or more character designers. The modeler may design and maintain a modeling topology conducive to a storyboarded range of deformations. In another example, a user of the one or more design computers 610 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 610 acting as an animator may employ one or more systems or tools to specify motion and position of one or more objects over time to produce an animation.

Object library 620 can include elements configured for storing and accessing information related to objects used by the one or more design computers 610 during the various stages of a production process to produce CGI and animation. Some examples of object library 620 can include a file, a database, or other storage devices and mechanisms. Object library 620 may be locally accessible to the one or more design computers 610 or hosted by one or more external computer systems.

Some examples of information stored in object library 620 can include an object itself, metadata, object geometry, object topology, rigging, control data, animation data, animation cues, simulation data, texture data, lighting data, shader code, or the like. Object library 620 can also store one or more solvers, such as the solvers discussed in FIGS. 5 and 6, block 510 that are used to solve for facial expression transfer. An object stored in object library 620 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 630 can include hardware and/or software elements configured for modeling one or more objects. Modeling can include the creating, sculpting, and editing of an object. In various embodiments, the one or more object modeling systems 630 may be configured to generated a model to include a description of the shape of an object. The one or more object modeling systems 630 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 630 may further generate model data (e.g., 2D and 3D model data) for use by other elements of system 600 or that can be stored in object library 620. The one or more object modeling systems 630 may be configured to allow a user to associate additional information, metadata, color, lighting, rigging, controls, or the like, with all or a portion of the generated model data.

The one or more object articulation systems 640 can include hardware and/or software elements configured to articulating one or more computer-generated objects. Articulation can include the building or creation of rigs, the rigging of an object, and the editing of rigging. In various embodiments, the one or more articulation systems 640 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 640 may further generate articulation data (e.g., data associated with controls or animations variables) for use by other elements of system 600 or that can be stored in object library 620. The one or more object articulation systems 640 may be configured to allow a user to associate additional information, metadata, color, lighting, rigging, controls, or the like, with all or a portion of the generated articulation data.

The one or more object visual effects systems 650 can include hardware and/or software elements configured for animating one or more computer-generated objects. Animation can include the specification of motion and position of an object over time. The one or more object visual effects systems 650 may be invoked by or used directly by a user of the one or more design computers 610 and/or automatically invoked by or used by one or more processes associated with the one or more design computers 610.

In various embodiments, the one or more visual effects systems 650 may be configured to enable users to manipulate controls or animation variables or utilized character rigging to specify one or more key frames of animation sequence. The one or more visual effects systems 650 generate intermediary frames based on the one or more key frames. In some embodiments, the one or more visual effects systems 650 may be configured to enable users to specify animation cues, paths, or the like according to one or more predefined sequences. The one or more visual effects systems 650 generate frames of the animation based on the animation cues or paths. In further embodiments, the one or more visual effects systems 650 may be configured to enable users to define animations using one or more animation languages, morphs, deformations, or the like. In various embodiments, the one or more visual effects systems 650 may be configured to generate animated content utilizing captured images from taking and witness cameras of any of the motion capture systems discussed herein.

The one or more object visual effects systems 650 may further generate animation data (e.g., inputs associated with controls or animations variables) for use by other elements of system 600 or that can be stored in object library 620. The one or more object visual effects systems 650 may be configured to allow a user to associate additional information, metadata, color, lighting, rigging, controls, or the like, with all or a portion of the generated animation data.

The one or more object simulation systems 660 can include hardware and/or software elements configured for simulating one or more computer-generated objects. Simulation can include determining motion and position of an object over time in response to one or more simulated forces or conditions. The one or more object simulation systems 660 may be invoked by or used directly by a user of the one or more design computers 610 and/or automatically invoked by or used by one or more processes associated with the one or more design computers 610.

In various embodiments, the one or more object simulation systems 660 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 660 may be used to simulate the behavior of objects, such as hair, fur, and cloth, in response to a physics model and/or animation of one or more characters and objects within a computer-generated scene.

The one or more object simulation systems 660 may further generate simulation data (e.g., motion and position of an object over time) for use by other elements of system 600 or that can be stored in object library 620. The generated simulation data may be combined with or used in addition to animation data generated by the one or more object visual effects systems 650. The one or more object simulation systems 660 may be configured to allow a user to associate additional information, metadata, color, lighting, rigging, controls, or the like, with all or a portion of the generated simulation data.

The one or more object rendering systems 670 can be differentiable renderers and can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 670 may be invoked by or used directly by a user of the one or more design computers 610 and/or automatically invoked by or used by one or more processes associated with the one or more design computers 610. One example of a software program embodied as the one or more object rendering systems 670 can include PhotoRealistic RenderMan, or PRMan, produced by Pixar Animations Studios of Emeryville, Calif.

In various embodiments, the one or more object rendering systems 670 can be configured to render one or more objects to produce one or more computer-generated images or a set of images over time that provide an animation. The one or more object rendering systems 670 may generate digital images or raster graphics images.

In various embodiments, a rendered image can be understood in terms of a number of visible features. Some examples of visible features that may be considered by the one or more object rendering systems 670 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlight rays on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 670 may further render images (e.g., motion and position of an object over time) for use by other elements of system 600 or that can be stored in object library 620. The one or more object rendering systems 670 may be configured to allow a user to associate additional information or metadata with all or a portion of the rendered image.

Example Computer System

Figure 7:
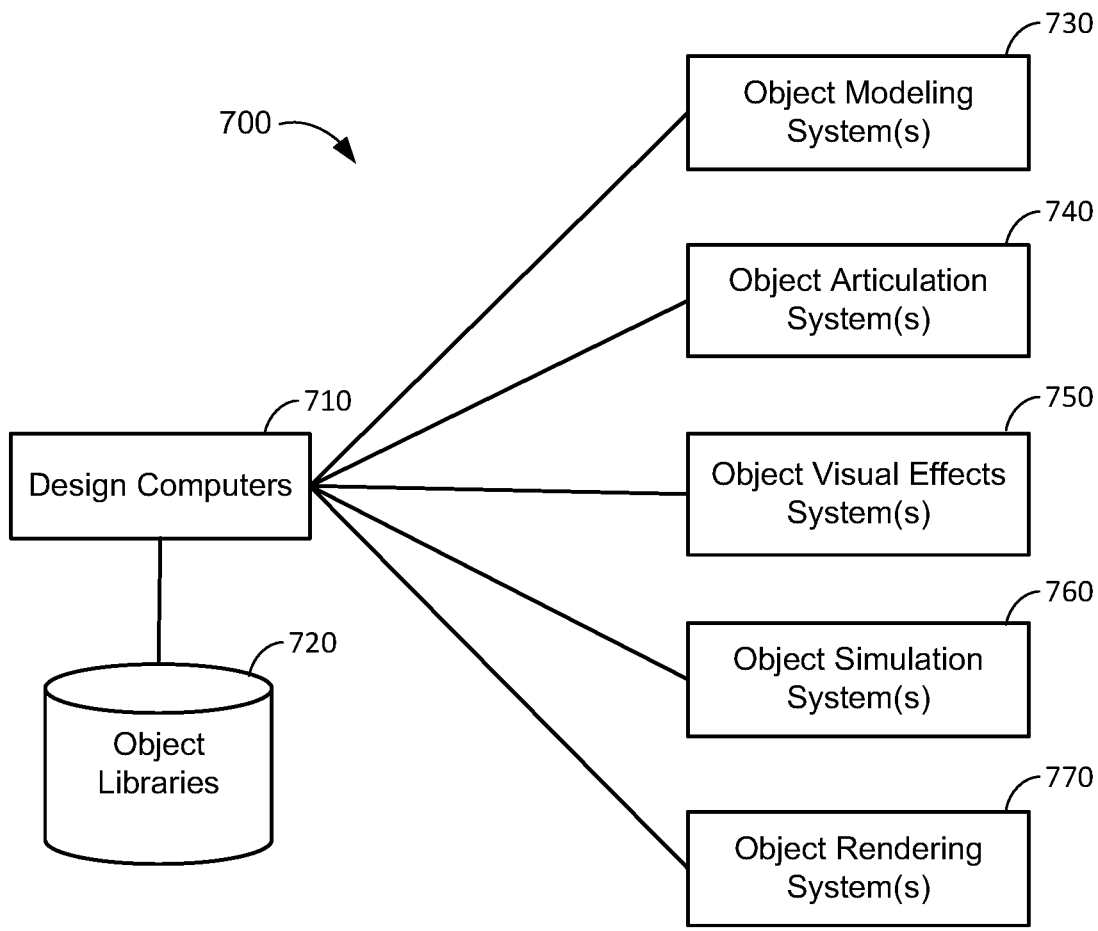
FIG. 7 is a simplified block diagram of system for creating computer generated imagery (CGI) and computer-aided animation that can implement or incorporate various embodiments in accordance with the disclosure.
Figure 8:
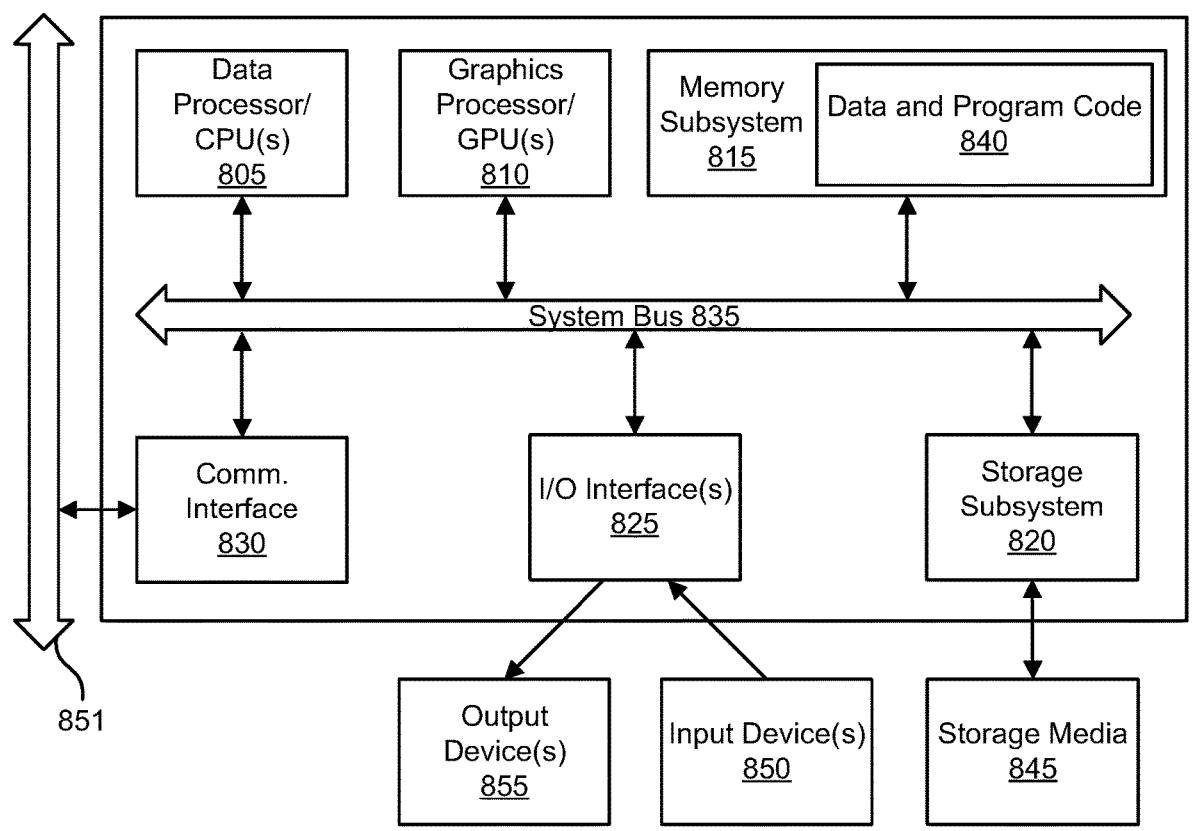
FIG. 8 is a block diagram of an exemplary computer system according to some embodiments of the invention.

FIG. 7 is a block diagram of an exemplary computer system 700 according to some embodiments of the invention. FIG. 7 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 700 and any of its components or subsystems can include hardware and/or software elements configured for performing methods described herein.

Computer system 700 may include familiar computer components, such as one or more one or more data processors or central processing units (CPUs) 705, one or more graphics processors or graphical processing units (GPUs) 710, memory subsystem 715, storage subsystem 720, one or more input/output (I/O) interfaces 725, communications interface 730, or the like. Computer system 700 can include system bus 735 interconnecting the above components and providing functionality, such connectivity and inter-device communication.

The one or more data processors or central processing units (CPUs) 705 can execute logic or program code or for providing application-specific functionality. Some examples of CPU(s) 705 can include one or more microprocessors (e.g., single core and multi-core) or micro-controllers, one or more field-gate programmable arrays (FPGAs), and application-specific integrated circuits (ASICs). As used herein, a processor includes a multi-core processor on a same integrated chip, or multiple processing units on a single circuit board or networked.

The one or more graphics processor or graphical processing units (GPUs) 710 can execute logic or program code associated with graphics or for providing graphics-specific functionality. GPUs 710 may include any conventional graphics processing unit, such as those provided by conventional video cards. In various embodiments, GPUs 710 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 710 may include any number of registers, logic units, arithmetic units, caches, memory interfaces, or the like.

Memory subsystem 715 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 715 can include data and program code 740.

Storage subsystem 720 can also store information using machine-readable articles, information storage devices, or computer-readable storage media. Storage subsystem 720 may store information using storage media 745. Some examples of storage media 745 used by storage subsystem 720 can include floppy disks, hard disks, optical storage media such as CD-ROMs, DVDs and bar codes, removable storage devices, networked storage devices, or the like.

In some embodiments, all or part of data and program code 740 may be stored using storage subsystem 720.

The one or more input/output (I/O) interfaces 725 can perform I/O operations. One or more input devices 750 and/or one or more output devices 755 may be communicatively coupled to the one or more I/O interfaces 725. The one or more input devices 750 can receive information from one or more sources for computer system 700. Some examples of the one or more input devices 750 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 750 may allow a user of computer system 700 to interact with one or more non-graphical or graphical user interfaces to enter a comment, select objects, icons, text, user interface widgets, or other user interface elements that appear on a monitor/display device via a command, a click of a button, or the like.

The one or more output devices 755 can output information to one or more destinations for computer system 700. Some examples of the one or more output devices 755 can include a printer, a fax, a feedback device for a mouse or joystick, external storage systems, a monitor or other display device, a communications interface appropriately configured as a transceiver, or the like. The one or more output devices 755 may allow a user of computer system 700 to view objects, icons, text, user interface widgets, or other user interface elements. A display device or monitor may be used with computer system 700 and can include hardware and/or software elements configured for displaying information.

Communications interface 730 can perform communications operations, including sending and receiving data. Some examples of communications interface 730 may include a network communications interface (e.g. Ethernet, Wi-Fi, etc.). For example, communications interface 730 may be coupled to communications network/external bus 760, such as a computer network, a USB hub, or the like. A computer system can include a plurality of the same components or subsystems, e.g., connected together by communications interface 730 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 700 may also include one or more applications (e.g., software components or functions) to be executed by a processor to execute, perform, or otherwise implement techniques disclosed herein. These applications may be embodied as data and program code 740. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 715 and/or storage subsystem 720.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of explanation, numerous specific details have been set forth in order to provide a thorough understanding of various embodiments of the present invention. It will be apparent, however, to one skilled in the art that embodiments of the present invention may be practiced without some of these specific details. In other instances, well-known structures and devices may have been shown in block diagram form.

This description has provided exemplary embodiments only, and is not intended to limit the scope, applicability, or configuration of the disclosure. Rather, this description of the exemplary embodiments provides those skilled in the art with an enabling description for implementing an exemplary embodiment. It should be understood that various changes may be made in the function and arrangement of elements without departing from the spirit and scope of the invention as set forth in the appended claims.

Specific details have been given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "non-transitory, computer-readable medium" includes, but is not limited to portable or fixed storage devices, optical storage devices, and various other mediums capable of storing instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Additionally, for the purposes of illustration, methods may have been described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Although the disclosure has been described with respect to specific embodiments, it will be appreciated that the disclosure is intended to cover all modifications and equivalents within the scope of the following claims.

What is claimed is:

1. A method of transferring a facial expression from a subject to a computer generated character where the subject was filmed in an uncontrolled environment with low-frequency, static illumination, the method comprising:
   receiving a plate with an image of the facial expression of the subject and an estimate of intrinsic parameters of a camera used to film the plate;
   generating a three-dimensional parameterized deformable model of a face of the subject, the three-dimensional parameterized deformable model comprising a plurality of model parameters where different facial expressions of the subject can be obtained by varying values of the plurality of model parameters;
   generating, from the plate, an estimate of lighting conditions that illuminate the subject in the plate and albedo estimates for the three-dimensional parameterized deformable model;
   initially solving for the facial expression in the plate by executing a deformation solver to solve for at least some parameters of the three-dimensional parameterized deformable model with a differentiable renderer and shape-from-shading techniques, using as inputs, the three-dimensional parameterized deformable model, the estimated intrinsic camera parameters, the estimated lighting conditions and the albedo estimates over a first series of iterations to infer geometry of the facial expression of the subject in the plate and generate an intermediate facial mesh using a set of parameter values of the three-dimensional parameterized deformable model which result in an intermediate facial expression that approximates the facial expression of the subject in the plate;
   generating, from the intermediate facial mesh, refined albedo estimates for the three-dimensional parameterized deformable model; and
   subsequently solving for the facial expression in the plate by executing the deformation solver using the intermediate facial mesh, the estimated intrinsic camera parameters, the estimated lighting conditions and the refined albedo estimates as inputs over a second series of iterations to infer geometry of the facial expression of the subject in the plate and generate a final facial mesh using the set of parameter values of the three-dimensional parameterized deformable model which result in a final facial expression that more closely matches the facial expression of the subject in the plate than the intermediate facial mesh.

2. The method of claim 1, wherein, the three-dimensional parameterized deformable model comprises a plurality of blendshapes, each blendshape in the plurality of blendshapes representing a different facial expression of the subject and wherein, the set of parameter values of the three-dimensional parameterized deformable model comprise a set of blendshape weight values, one blendshape weight value per each blendshape.

3. The method of claim 2, wherein, the set of parameter values of the three-dimensional parameterized deformable model further comprise rotation and translation values that represent a rigid adjustment of a head of the subject.

4. The method of claim 3, wherein the step of solving for the facial expression in the plate to generate the intermediate facial mesh includes, in order: solving for shape weight values from rotoscoping splines and 2D landmarks on the plate, solving for the shape weights from the plate, and then solving the shape weight, the rotation and the translation values using the shape-from-shading techniques.

5. The method of claim 3, wherein, the computer-generated character includes a head that is sized or shaped differently than the head of the subject and the set of parameter values of the three-dimensional parameterized deformable model further comprise a value for a delta vector that represents a per vertex displacement used in transferring the facial expression of the subject to the computer-generated character.

6. The method of claim 3, wherein, the plate is an image comprising more than a million pixels with each pixel having a particular RGB value and wherein, during each iteration, the differentiable renderer generates a rendering of the three-dimensional parameterized deformable model and the deformation solver tries to minimize differences between the RGB values of the plate and RGB values of corresponding pixels in the rendered version of the three-dimensional parameterized deformable model.

7. The method of claim 6, wherein, an initial iteration of the initially solving for the facial expression in the plate comprises:
   rendering an initial facial mesh, generated from the three-dimensional parameterized deformable model, representing a neutral expression of the subject;
   trying to minimize differences between the RGB values of the plate and RGB values of the rendered initial facial mesh representing the neutral expression; and generating an updated facial mesh in which the facial expression of the subject in the updated facial mesh more closely matches the facial expression of the subject in the plate than the facial expression of the initial facial mesh.

8. The method of claim 7, wherein, for each iteration, an output of current iteration is closer to actual representation of the facial expression of the subject in the plate than an output of the previous iteration.

9. The method of claim 1, wherein the albedo estimates are generated and then refined at different vertices of the three-dimensional parameterized deformable model.

10. The method of claim 2, further comprising generating a visual effect from the set of blendshape weight values and incorporating the visual effect into one or more of an animation, a movie, a video, a video game, or virtual or augmented reality content.

11. The method of claim 1, wherein the three dimensional parameterized deformable model of the face of the subject includes a facial rig generated by an artist who modifies a neutral expression of a generic human facial rig to better match the face of the subject.

12. A method of transferring a facial expression from a subject in a previously filmed performance to a computer generated character where the subject was filmed in an uncontrolled environment with low-frequency, static illumination, the method comprising:
receiving digital footage of the previously filmed performance including a plurality of sequentially ordered plates each of which includes an image of the facial expression of the subject and receiving an estimate of intrinsic parameters of a camera used to film the plurality of plates;
generating a three-dimensional parameterized deformable model of a face of the subject, the three-dimensional parameterized model comprising a plurality of model parameters where different facial expressions of the subject can be obtained by varying values of the plurality of model parameters;
generating, from one or more plates in the plurality of plates, an estimate of lighting conditions that illuminate the subject in each plate and albedo estimates at different vertices of the three-dimensional parameterized deformable model;
generating a computer model of the previously filmed performance by, for each individual plate in the plurality of sequentially ordered plates, processing the individual plate independently of other plates in the plurality of plates to solve for the facial expression in the plate being processed by:
executing a deformation solver to initially solve for at least some parameters of the three-dimensional parameterized deformable model with a differentiable renderer and shape-from-shading techniques, using as inputs, the three-dimensional parameterized deformable model, the estimated intrinsic camera parameters, the estimated lighting conditions and the albedo estimates over a first series of iterations to infer geometry of the facial expression of the subject in the plate and generate an intermediate facial mesh using a set of parameter values of the three-dimensional parameterized deformable model which result in an intermediate facial expression that approximates the facial expression of the subject in the plate;
generating, from the intermediate facial mesh, refined albedo estimates at the different positions of the three-dimensional parameterized deformable model; and
subsequently solving for the facial expression in the plate by executing the deformation solver using the intermediate facial mesh, the estimated intrinsic camera parameters, the estimated lighting conditions and the refined albedo estimates as inputs over a second series of iterations to infer geometry of the facial expression of the subject in the plate and generate a final facial mesh using the set of parameter values of the three-dimensional parameterized deformable model which result in a final facial expression that more closely matches the facial expression of the subject in the plate than the intermediate facial mesh.

13. The method of claim 12, wherein, the three-dimensional parameterized deformable model comprises a plurality of blendshapes, each blendshape in the plurality of blendshapes representing a different facial expression of the subject and wherein, the set of parameter values of the three-dimensional parameterized deformable model comprise a set of blendshape weight values, one blendshape weight value per each blendshape.

14. The method of claim 13, further comprising generating a visual effect from the set of blendshape weight values and incorporating the visual effect into one or more of an animation, a movie, a video, a video game, or virtual or augmented reality content.

15. The method of claim 13, wherein, the set of parameter values of the three-dimensional parameterized deformable model further comprise rotation and translation values that represent a rigid adjustment of a head of the subject.

16. The method of claim 15, wherein, the computer-generated character includes a head that is sized or shaped differently than the head of the subject and the set of parameter values of the three-dimensional parameterized deformable model comprise a value for a delta vector that represents a per vertex displacement used in transferring the facial expression of the subject to the computer-generated character.

17. The method of claim 15, wherein, each plate in the plurality of sequentially ordered plates is an image comprising more than a million pixels with each pixel having a particular RGB value and wherein, during each iteration, the differentiable renderer generates a rendering of the three-dimensional parameterized deformable model and the deformation solver tries to minimize differences between the RGB values of the plate and RGB values of corresponding pixels in the rendered version of the three-dimensional parameterized deformable model.

18. The method of claim 17, wherein, an initial iteration of the initially solving for the facial expression in the plate comprises: (i) rendering an initial facial mesh, generated from the three-dimensional parameterized deformable model, representing a neutral expression of the subject; (ii) trying to minimize differences between the RGB values of the plate and RGB values of the rendered initial facial mesh representing the neutral expression; and (iii) generating an updated facial mesh in which the facial expression of the subject in the updated facial mesh more closely matches the facial expression of the subject in the plate than the facial expression of the initial facial mesh.

19. The method of claim 18, wherein, for each additional iteration, an output of current iteration is closer to the actual representation of the subject in the plate than an output of the previous iteration.

20. The method of claim 12, wherein the three dimensional parameterized deformable model of the face of the subject includes a facial rig generated by an artist who modifies a neutral expression of a generic human facial rig to better match the face of the subject.

\* \* \* \* \*

UNITED STATES PATENT AND TRADEMARK OFFICE
CERTIFICATE OF CORRECTION

PATENT NO. : 11,049,332 B2
APPLICATION NO. : 16/808110
DATED : June 29, 2021
INVENTOR(S) : Matthew Loper et al.

It is certified that error appears in the above-identified patent and that said Letters Patent is hereby corrected as shown below:

In the Claims

Claim 16, Column 24, Line 35:
Replace "deformable model comprise a value for a delta vector that" with --deformable model further comprise a value for a delta vector that--

Signed and Sealed this
Twenty-first Day of June, 2022

*Katherine Kelly Vidal*

Katherine Kelly Vidal
*Director of the United States Patent and Trademark Office*